Feb. 10, 1970     A. WOLF ET AL     3,494,302

METHOD AND APPARATUS FOR MAKING DANISH PASTRY

Filed Aug. 21, 1967     4 Sheets-Sheet 1

INVENTORS
Andrew Wolf
John L. DeKeizer
Arthur Storrie
BY Dressler, Goldsmith, Clement & Gordon
ATTORNEYS

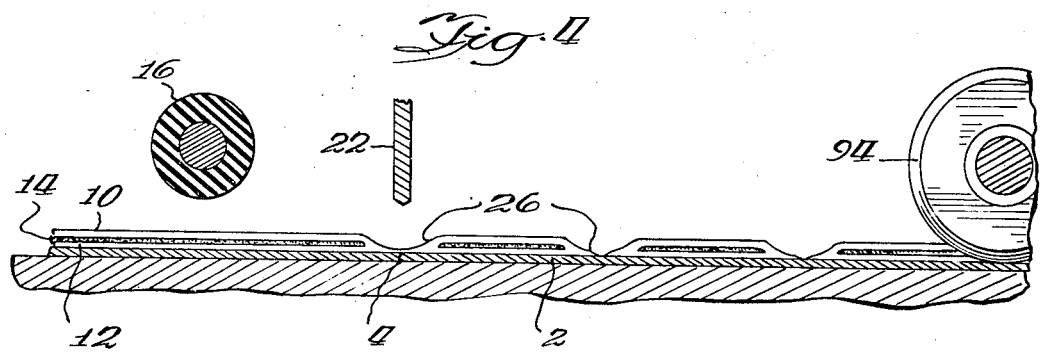
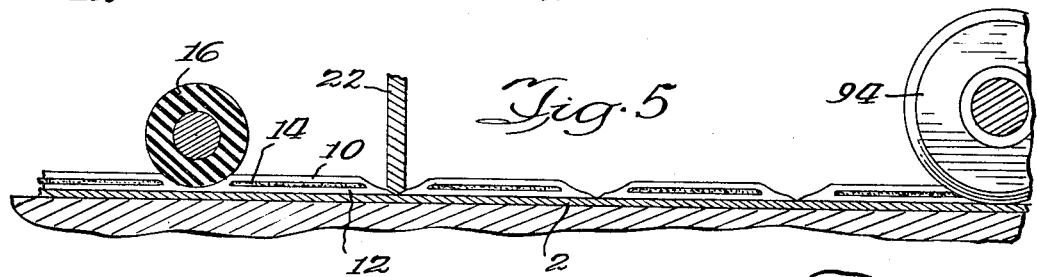
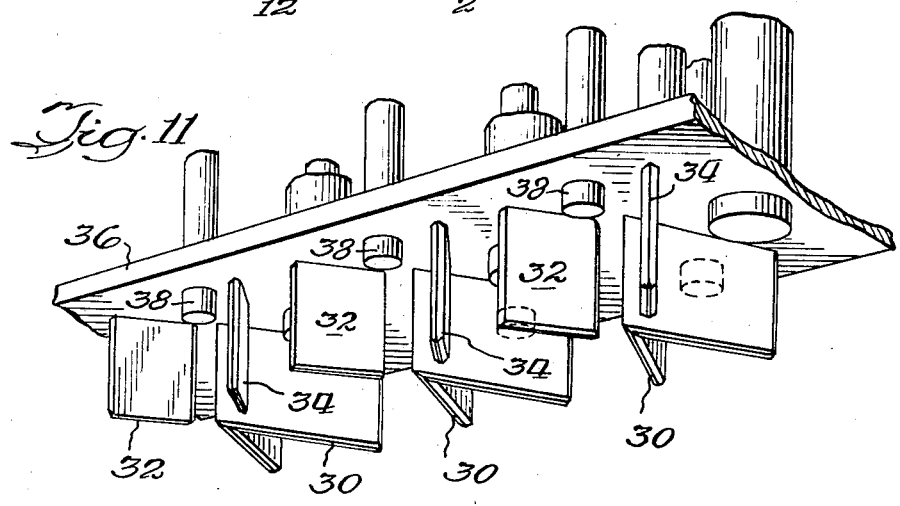
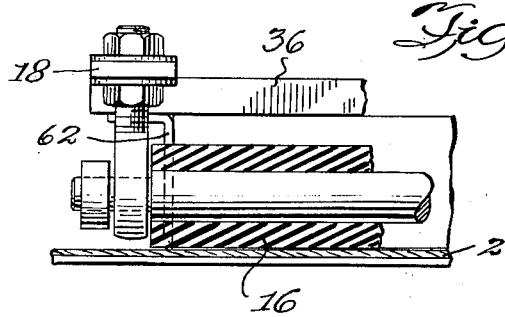

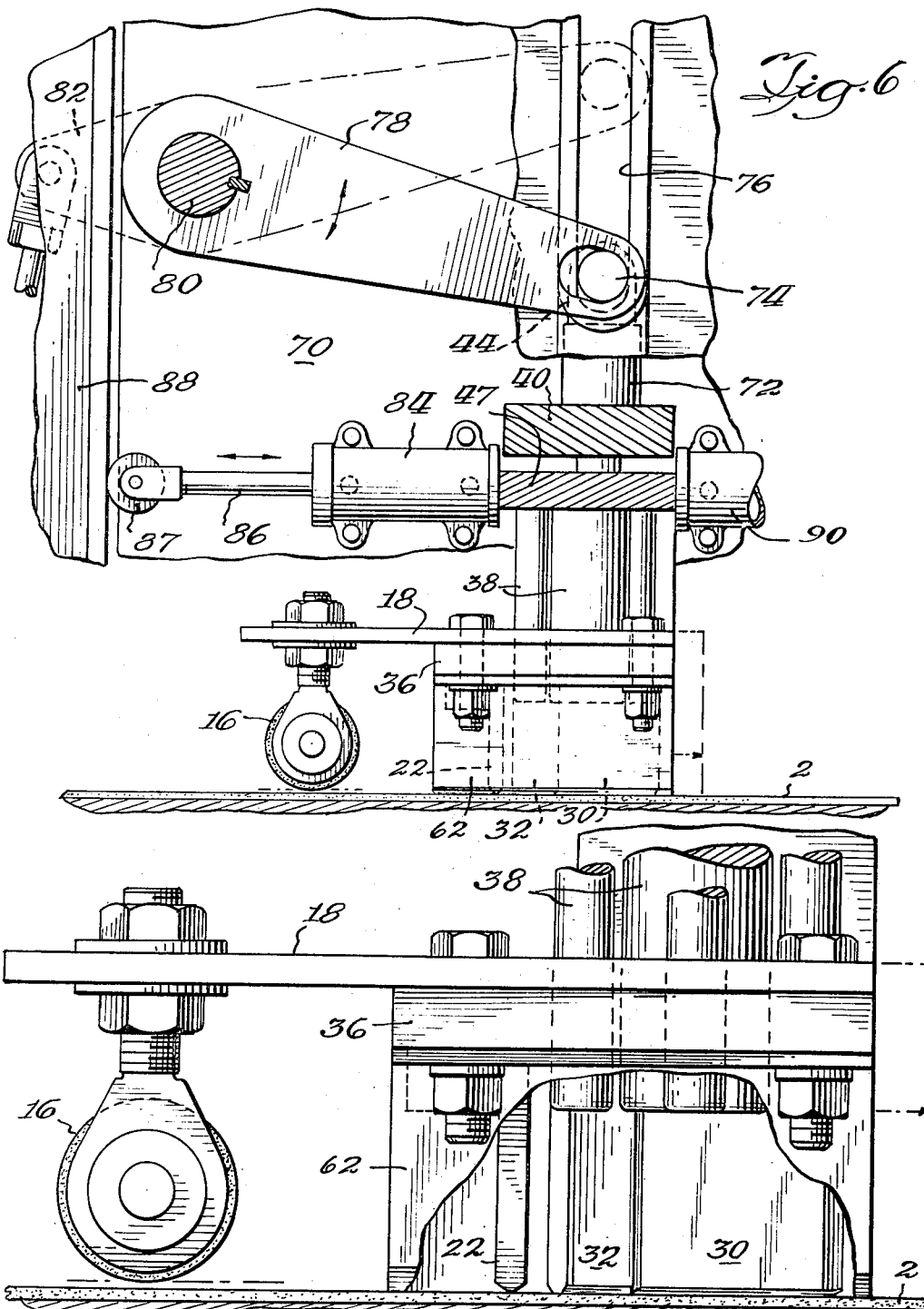

Feb. 10, 1970     A. WOLF ETAL     3,494,302
METHOD AND APPARATUS FOR MAKING DANISH PASTRY
Filed Aug. 21, 1967     4 Sheets-Sheet 4
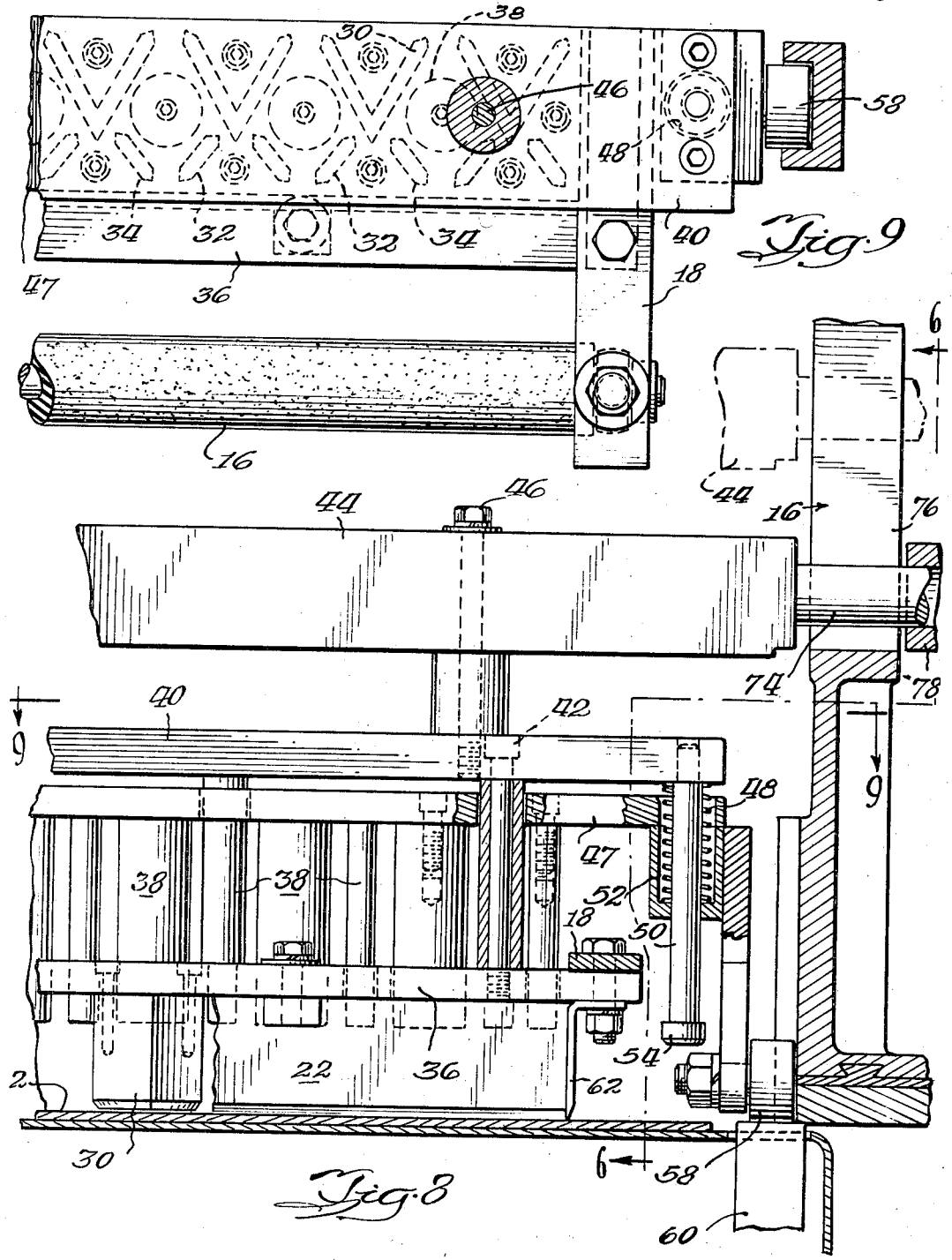
INVENTORS
Andrew Wolf
John L. D. Keizer
Arthur Storrie
BY Dressler, Goldsmith, Clement & Gordon
ATTORNEYS

United States Patent Office 3,494,302
Patented Feb. 10, 1970

3,494,302
METHOD AND APPARATUS FOR
MAKING DANISH PASTRY
Andrew Wolf, Deerfield, John L. DeKeizer, Northbrook, and Arthur Storrie, Chicago, Ill., assignors to Kitchens of Sara Lee, Inc., a corporation of Maryland
Filed Aug. 21, 1967, Ser. No. 661,947
Int. Cl. A23g 3/20
U.S. Cl. 107—1                                  10 Claims

ABSTRACT OF THE DISCLOSURE

The apparatus disclosed herein is for making individual Danish pastries of the "envelope" or "pocket-filled" type. The pastries are made from a sandwich of two layers of dough and an intermediate filling layer. The layers are assembled in large sheets after which they are rolled, punched and severed into their finished shape, which is generally rectangular. The upper surface of the pastry is punched with a die to emboss an "X" in the upper dough layer of the pastry. The elongated uncut sandwich is disposed on a longitudinally extending conveyor and is indented transversely by a roller to move the filling away from the plane where the sandwich is to be transversely cut. The sandwich is then directed below a suitably formed die and cutting mechanism where the upper surface is embossed with a die in the prescribed manner and the sandwich is cut transversely intermediate its indentation. After leaving the die apparatus, the sandwich is cut in a longitudinal direction to complete the formation of the pastry.

---

Heretofore, Danish pastry of this type has been essentially hand-formed by overlapping generaly triangular sections of dough onto a layer of filling located on a rectangular piece of dough. It can be appreciated that the manufacture of Danish pastry of this type in this manner is inefficient, time-consuming, and expensive, and that an automated procedure for obtaining high production rates would be very desirable. Apparatus capable of accomplishing this should also be simple in construction, efficient in operation, and easy to maintain.

In accordance with the present invention, there is provided an automated conveyor system which will produce "envelope" or "pocket-filled" type Danish pastries free of any manual operations heretofore essential in the production of such items. Essentially, the apparatus disclosed herein takes a sandwich comprising two layers of dough and a central filling layer and cuts the sandwich into rectangular sections, which have embossed into its upper dough layer a generally X-type design. During the embossing step, the top layer of dough is compressed and deformed beyond its elastic limit. The top dough layer acted on by the die forces the filling back from the die and acts to seal the filling within the pastry. When the pastry is baked, the general outline embossed by the die remains in the top dough layer.

Prior to the cutting of the sandwich into its final configuration, the sandwich that is moved longitudinally by a power-driven conveyor is subjected to a transversely extending roller which moves the filling away from the transverse cutting planes, which prevents the exposure of the filling at these junctures. The top surface of the sandwich is then subjected to a punch having the desired die configuration. After the upper dough surface has been punched, the pastry is cut into its final form by a longitudinal cutting of the sandwich by suitably positioned disc cutters. The Danish pastry so formed is then baked into its final form either individually, or in groups, as desired.

The many advantages flowing from the apparatus capable of performing these functions and the method practiced thereby will be apparent from the following drawings, in which:

FIGURE 4 is a partial cross-sectional view of the sandwich to be rolled and transversely cut with the roller and the cutter shown in the raised position;

FIGURE 5 is a view similar to FIGURE 4 showing the roller and cutter in contact with the sandwich;

FIGURE 6 is a partial sectional view of a mechanism that can be used for moving the die, roller and cutter assembly in the vertical and horizontal directions;

FIGURE 7 is an enlarged, partially cut away view of the roller, cutter, and die assembly shown with associated stripper members;

FIGURE 8 is a partial sectional view showing a portion of the die and stripper mechanism in conjunction with the side cutter;

FIGURE 9 is a plan view taken along line 9—9 of FIGURE 8;

FIGURE 10 is an elevation in section showing the mounting for the roller; and

FIGURE 11 is a perspective view of the die and stripper mechanism.

Figure 2:
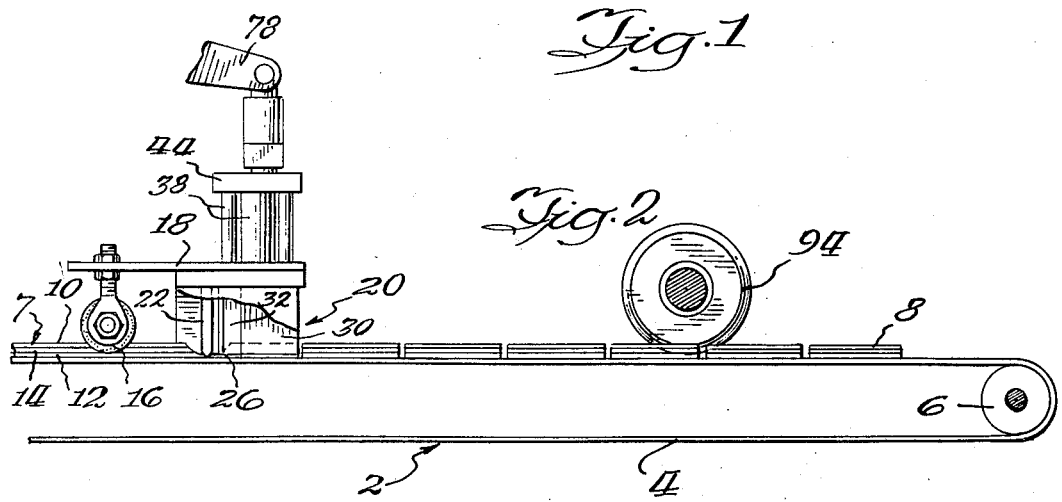
FIGURE 2 is a side elevation view of the apparatus used to cut the sandwich into the desired configuration and die pattern.
Figure 3:
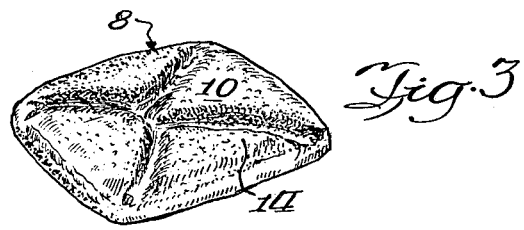
FIGURE 3 is a perspective view of a baked Danish pastry of the type made by the illustrated apparatus.

Referring first to FIGURE 2, there is shown a conveyor 2 consisting of an endless belt 4, disposed over rollers 6 (only one of which is illustrated). The belt is driven by a suitable drive mechanism (not shown). Fed to the conveyor from appropriate bakery equipment is a sandwich 7 out of which the pastries 8 (see FIGURE 3) are made. The sandwich 7 includes an upper layer of dough 10, a bottom dough layer 12, and a layer of fruit, or other desired filling 14 therebetween.

Briefly, the lower layer 12 is initially placed on the conveyor 2 and the filling layer 14 is placed thereon, which filling does not extend all the way out to the sides of the bottom dough layers. The top dough layer 10 is then superimposed on the filling, and the three layers are pressed together. The sandwich 7 formed by the two dough layers and filling are then passed under a pressure roller 16.

The pressure roller 16 which is connected to a roller support plate 18 through conventional fastening means extends transversely across the conveyor and as shown in FIGURE 5 functions to engage the sandwich 7 and press the two layers of dough 10, 12 together and push the filling 14 away from the juncture of the roller and the dough layers. The vertical movement of the pressure roller 16 is part of a movably mounted roller, die, cutter and stripper mechanism generally referred to by the numeral 20 which will be hereinafter referred to as the forming assembly. The forming assembly 20, when in its lower position with the dies, cutter and roller in contact with the sandwich is moved in a longitudinal direction in synchronism with the conveyor to prevent relative movement therebetween during the die, cutting and rolling action. The forming assembly is also reciprocably mounted so that it can be raised and lowered at the appropriate time interval to die-form the next transverse row of pastries to be operated on. The belt 4 is moved continuously and the vertical and horizontal movement of the forming assembly is controlled by suitable interrelated control mechanisms, the details of which form no part of the present invention. There are, however, illustrated in FIGURE 6 and described hereinafter, mechanisms which when actuated will function to move the forming assembly in the vertical and horizontal directions. The last-mentioned mechanisms are merely intended to show the way this can be accomplished and, as will be obvious to one skilled in the art, numerous other devices could be employed to obtain the desired motion.

Referring particularly to FIGURES 2, 4, and 5, it is noted that the knife 22, which extends transversely across the conveyor is spaced from the vertical center line of the roller 16 a distance equal to the length of the pastry 8 to be cut from the sandwich 7. Thus, when the forming assembly 20, which is raised and lowered in synchronism with the longitudinal movement of the belt 4, is moved downwardly, the knife 22, which makes the transverse cuts 24 (see FIGURE 1) contacts the center of the transversely extending depression 26 formed in the sandwich by the pressure roller 16. This relationship can best be seen by referring to FIGURE 5, wherein the knife 22 and roller 16 are shown in engaging position with the sandwich 7.

Figure 1:
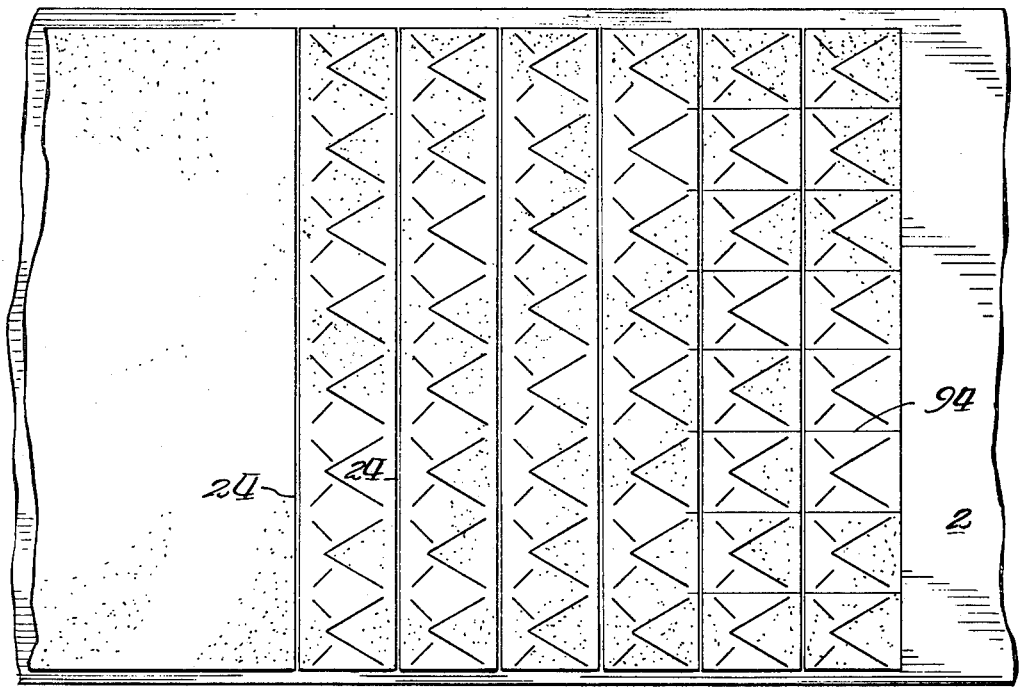
FIGURE 1 is a plan view of a portion of the sandwich shown in FIGURE 2 after it has been die-embossed.

At the same time the knife and pressure roller are acting on the sandwich, the die portion of the forming assembly 20 is also moved into engagement with the upper layer of the sandwich immediately forward of the knife 22. The die assembly described in detail hereinafter acts to punch the desired pattern in the upper surface of the sandwich. The particular pattern punched by the instant apparatus is shown in FIGURE 1.

The die members are generally in the form of an X, and as shown in detail in FIGURE 11 consist of a V-shaped punch 30 and two straight plate punches 32, 34, which roughly form a V that extends generally outwardly from the base of the V-shaped die 30. These die members 30, 32, 34 are secured to the underside of a transversely extending die support plate 36 that extends across the conveyor. Typical dies used in the illustrated apparatus are on the order of ¼ inch thick and are rounded off to around ⅛ inch (see FIGURE 7). When the dies contact the upper dough layer, they act to emboss the pastry to form the configuration shown in outline form in FIGURE 1. Essentially, the top layer of dough is compressed and deformed beyond its elastic limit into the desired configuration. The dies, during the embossing action, press the filling away therefrom and the dough carried into the sandwich by the dies acts to seal the filling into the four generally triangular pastry sections defined by the dies. In a typical situation, the dough layer sealing the filling in the area of the embossing dies is on the order of ten mils. It can be appreciated that there are as many sets of these dies provided as there are pastries to be cut along the width of the conveyor 2.

In order to prevent the dough from sticking to the dies, the forming assembly 20 includes strippers 38 which extend through openings provided in the plate 36 and function to strip any portion of the sandwich that may be stuck to the dies when the dies are moved upwardly away from the conveyor.

Referring now to FIGURE 8, there is shown the mounting relationship between the die and stripper assemblies. When the forming assembly 20 is in the position shown in FIGURE 8, the dies 30, 32, 34 are in contact with the sandwich 7 on the conveyor and the strippers 38 are spaced from the conveyor.

After the upper surface of the sandwich 7 has been die-embosed, the die plate 36 and associated dies 30, 32, 34 are moved vertically upward relative to the strippers 38, which remain generally in the position shown in FIGURE 8. The upward movement of the dies carries them past the strippers, thus permitting the strippers to function to remove the sandwich from the dies in the event any of it has remained in contact therewith. After the stripping action has taken place, further upward movement of the die assembly results in the strippers being moved upward along with the dies.

The interconnection between the die and stripper assembly resulting in the desired interaction therebetween is shown in detail in FIGURE 8. As shown therein, the die support plate 36 is secured to an upper support plate 40 by a number of bolts 42, only one of which is shown. The plate 40 is secured to a frame member 44 by bolts 46. With this arrangement, upward movement of the frame member 44 carries with it plate 40, die support plate 36, and attached dies 30, 32, 34.

The stripper assembly includes a stripper plate 47 secured to which are the strippers 38, which depend therefrom. The stripper assembly is resiliently positioned relative to the support plate 40 by a plurality of springs 48 (only one of which is shown) which extends around bolts 50 that are secured to and depend from support plate 40. The springs 48 are located in recesses 52 defined by the stripper plate 47. The bolts 50 include a head 54 which when raised engages the outer plate surface defining recess 52 in which the springs 48 are located. It can thus be appreciated that upward movement of the plate 40 will move heads 54 into engagement with the outer bottom surface of recess 52 to move the stripper plate 47 along with the frame member 44 after the frame member 44 has been raised a predetermined amount. Downward movement of the stripper assembly is limited by a roller 58 which is secured to the stripper assembly, which roller movement is limited by stop 60.

It remains to note that as shown in FIGURE 8, the side cutters 62 for the sandwich 5 are secured to the die plate 36 and act in conjunction with the die plate to sever the sides of the sandwich disposed on the conveyor when the forming assembly 20 is lowered.

Turning to FIGURE 6, there is shown in outline form a mechanism for moving the forming assembly 20 in the vertical direction to effectuate die-cutting of successive transverse rows of pastry. As hereinbefore stated, the forming assembly is also moved in the horizontal plane, which movement is provided for since it is desirable to have little or no relative movement between the forming assembly and the continuously moving conveyor during the punching operation. It can be appreciated that if the forming assembly was reciprocated during a time interval at which there was little or no forward movement of the conveyor, it would not be necessary to provide for horizontal movement of the assembly. Assuming that the speed at which the forming appartus is operated makes it desirable to provide for the subject horizontal movement, there is illustrated in FIGURE 6 a mechanism which can be used to provide same. The horizontal reciprocating motion provided acts to eliminate relative movement between the assembly and the conveyor to prevent any distortion of the pastry being formed. The mechanism illustrated in FIGURE 6 is by way of illustration only and not intended to be limiting, whereby the assembly can be reciprocated in the vertical direction and at the proper time move in the horizontal direction in synchronism with the speed of the conveyor when the assembly is in contact with the conveyor. In this particular embodiment, there is provided an approximately three-inch vertical movement and a one-half-inch horizontal movement.

Briefly, the mechanism disclosed for reciprocating the forming assembly 20 in the vertical direction is mounted on a plate 70. The vertical movement of the forming assembly 20 acts on the frame member 44 to raise and lower this member and the attached pressing roller 16, dies 30, 32, 34, and strippers 38. To this end, an upwardly extending rod 72 is connected to the frame member 44, which rod 72 has connected to its upper end thereof a pin 74. The pin is located in a slot 76 defined by the plate 70, which slot guides the pin and attached forming assembly 20 during its vertical travel. The vertical movement of the pin 74 is effected through the operation of a crank arm 78, which is secured to a shaft 80. The crank arm 78 is oscillated by the shaft 80 through the action of a link 82 that is connected at one end to the shaft 80 and at its other end to suitable driving mechanism (not shown). The operation of the crank arm 78 is synchronized with the movement of the conveyor, so that the assembly 20 will be moved into and out of contact with succeeding rows of pastries to be cut out of the sandwich moving on the conveyor.

As previously mentioned, the movement of the forming assembly in the horizontal direction results from the desire to eliminate relative movement between the forming assembly and the conveyor during the time the forming assembly is in contact with the sandwich on the conveyor. To this end, there is provided a fluid-operated cylinder 84 which is secured to the plate 70 and is connected at one end to the frame member 44. Extending from its other end is a movably mounted rod 86 which has a roller 87 thereon that is in contact with a fixed plate 88. When fluid is supplied to the cylinder 84, which occurs at about the time the forming assembly contacts the sandwich 7 on the conveyor, the plate 70 and attached forming assembly is moved to the right relative to the plate 88. Following this, after a predetermined time interval, the forming assembly is raised out of contact with the conveyor. The plate and attached forming assembly is moved to the left to place the forming assembly 20 in position to be moved downward into engagement with a succeeding row of pastries by a cylinder 90 secured to plate 70 and associated piston rod and roller (not shown), which are operated in a manner similar to that disclosed with respect to cylinder 84, rod 86, roller 87, and plate 88.

It remains to note that after the sandwich leaves the forming assembly, it is engaged by a plurality of transversely spaced longitudinally extending disc cutters 94 which cut the sandwich in the longitudinal direction. These cutters are designed to seal the edges of the pastry during the cutting action to prevent the filling from flowing out of the pastry. The longitudinal cutting of the sandwich completes the cutting of the sandwich into rectangular pastries 8.

METHOD OF OPERATION

Referring essentially to FIGURE 1, the sandwich 7 consisting of top and bottom dough layers 10, 12 and intermediate filling layer 14 is introduced onto a conveyor 2. The sandwich so formed is directed beneath a pressure roller 16 which forms a transversely extending groove 26 and in so doing moves the upper and lower dough surfaces into engagement and moves the filling away from the groove. The sandwich is then directed under the forming assembly 20 which includes a transversely extending knife 22, dies 30, 32, 34 and strippers 38. The assembly is moved downwardly into engagement with the sandwich, wherein the knife 22 transversely cuts the sandwich intermediate the grooves 26 formed by the pressure roller 16. At the same time, the dies 30, 32, 34 contact the top dough layer and emboss in the surface thereof a generally X-shaped configuration. After the top layer has been embossed by the dies, the forming assembly is retracted to admit another transverse row of pastries therebeneath, wherein a subsequent die-embossing and cutting operation is performed.

It is noted that when the die is retracted, strippers 38 act to remove any portions of the sandwich that may stick to the die members. Also, the forming assembly has been moved forward in synchronism with the forward movement of the conveyor during the cuting, die-embossing and rolling operations to prevent relative movement between the dough and forming assembly, which prevents distortion of the sandwich. After the transversely cut and die-formed sandwich leaves the forming assembly, it is contacted by disc cutters 94, which longitudinally cut the sandwich to form the rectangularly shaped pastries 8.

What is claimed is:

1. A method of making an individual filled pastry envelope closely simulating the appearance of a hand-formed and folded filled pastry envelope comprising the steps of:

making a sandwich of two layers of dough overlying and underlying an interposed layer of filling from which sandwich a plurality of said individual filled pastry envelopes are to be cut and formed, then for each of said individual pastry envelopes forming in one of said dough layers a plurality of elongate substantially intersecting grooves each extending from the central region to a peripheral region of a said envelope by die-embossing said one dough layer beyond its elastic limit toward said other dough layer while extruding filling away from said grooves, transversely and longitudinally sealing and cutting said sandwich into said plurality of individual filled and grooved pastry envelopes, whereby when each of said individual filled pastry envelopes is baked, each has the appearance of a hand-formed and folded filled pastry envelope.

2. In the method of claim 1 wherein said forming step comprises forming at least four substantially intersecting grooves.

3. In the method of claim 1 wherein during said groove-forming step said one dough layer is grooved into a sealing relationship with said other dough layer to isolate sections of filling within each of said individual filled pastries.

4. In the method of claim 1 wherein said sandwich is continuously formed and continuously moved in a first direction and wherein the steps of groove forming and transverse cutting and sealing are performed in synchronization with the movement of said sandwich in said first direction whereby there is no relative movement of said sandwich during said groove forming and transverse cutting and sealing steps.

5. Apparatus for forming a rectangular shaped die-embossed pastry including a power-driven conveyor means on which is located a sandwich of dough and filling to be cut into individual pastries, die-embossing means for embossing the upper surface of the dough to form a pattern therein, means for longitudinally cutting the sandwich, means for transversely pressing the sandwich to extrude the filling away from the plane of the sandwiches to be transversely cut to prevent extrusion of the filling from the pastry when it is transversely cut, means for transversely cutting the sandwich, means for stripping the sandwich from the die-embossing means to prevent sticking thereto, and means for vertically and horizontally synchronously moving the pressing, transverse-cutting, stripping and die-embossing means with respect to the conveyor to form successive rows of pastries and for preventing relative movement between said pressing, transverse-cutting die-embossing and stripping means and said conveyor when said pressing, transverse-cutting, die-embossing and stripping means are in contact with said sandwich.

6. Apparatus as set forth in claim 5 including means interconnecting said pressing, transverse-cutting, die-embossing and stripping means, whereby they move together as a unit.

7. Apparatus for forming a plurality of individually filled pastries each having the appearance of a hand-formed folded filled envelope, comprising a power-driven conveyor on which is located a sandwich of dough and filling which is to be formed into a plurality of side-by-side individual pastry envelopes, means for transversely sealing and cutting said sandwich into sandwich sections, means for forming a plurality of substantially intersecting grooves in the upper surface of said sandwich for each of the individual side-by-side pastry envelopes to be formed, means for stripping the sandwich from the forming means to prevent sticking thereto, means for longitudinally sealing and cutting said sandwich sections into a plurality of individual side-by-side filled pastry envelopes, whereby when said filled pastry envelopes are baked, the grooves provide the appearance of hand-filled and formed pastry envelopes for each of said individual filled pastry envelopes.

8. A method of making an individual filled pastry envelope closely simulating the appearance of a hand-formed and folded pastry envelope comprising the steps of:
  continuously making a sandwich of two layers of dough underlying an interposed layer of filling from which sandwich a plurality of said individual filled pastry envelopes are to be cut and formed,
  conveying said continuously formed sandwich in a first direction, on conveying means,
  transversely and longitudinally sealing and cutting said sandwich into a plurality of longitudinally and transversely spaced generally rectangular individual pastry envelopes,
  for each of said individual pastry envelopes forming in one of said dough layers a plurality of elongate substantially intersecting grooves each extending from the central region to a peripheral corner region of a said envelope by moving die-embossing means into said one dough layer to emboss said one dough layer beyond its elastic limit while extruding filling away from said grooves,
  and removing said die-embossing means from said one dough layer without removing said sandwich from said conveying means,
  whereby when each of said individual filled pastry envelopes is baked, each has the appearance of a hand-formed and folded filled pastry envelope.

9. In the method of claim 8 wherein said forming step comprises forming at least four substantially intersecting grooves.

10. In the method of claim 8 wherein during said groove-forming step said one dough layer is grooved into a sealing relationship with said other dough layer to isolate secitons of filling within each of said individual filled pastries.

References Cited

UNITED STATES PATENTS

| | | | |
|---|---|---|---|
| 2,144,720 | 1/1939 | Gibson | 107—54.2 |
| 2,923,259 | 2/1960 | Malnati | 107—68 |
| 3,111,914 | 11/1963 | Viviano | 107—47 |
| 3,354,842 | 11/1967 | Manspeaker. | |

WALTER A. SCHEEL, Primary Examiner

ARTHUR O. HENDERSON, Assistant Examiner

U.S. Cl. X.R.

107—54